United States Patent
Temple (12)

(10) Patent No.: US 9,950,937 B1
(45) Date of Patent: Apr. 24, 2018

(54) METHODS FOR TREATING LIQUID STREAMS CONTAINING QUATERNARY AMMONIUM COMPOUNDS

(71) Applicant: Stephen R. Temple, Santa Cruz, CA (US)

(72) Inventor: Stephen R. Temple, Santa Cruz, CA (US)

(*) Notice: Subject to any disclaimer, the term of this patent is extended or adjusted under 35 U.S.C. 154(b) by 521 days.

(21) Appl. No.: 14/035,942

(22) Filed: Sep. 24, 2013

Related U.S. Application Data

(60) Provisional application No. 61/705,529, filed on Sep. 25, 2012.

(51) Int. Cl.

| | |
|---|---|
| *E21B 21/06* | (2006.01) |
| *C02F 1/52* | (2006.01) |
| *C02F 1/68* | (2006.01) |
| *C02F 1/56* | (2006.01) |
| *E21B 43/34* | (2006.01) |
| *C09K 8/02* | (2006.01) |
| *E21B 21/00* | (2006.01) |
| *B01D 21/01* | (2006.01) |
| *C02F 1/00* | (2006.01) |
| *C02F 101/38* | (2006.01) |
| *C02F 1/58* | (2006.01) |

(52) U.S. Cl.
CPC ............... *C02F 1/5263* (2013.01); *C02F 1/56* (2013.01); *C02F 1/683* (2013.01); *E21B 21/06* (2013.01); *E21B 43/34* (2013.01); *C02F 1/00* (2013.01); *C02F 1/58* (2013.01); *C02F 2101/38* (2013.01); *C09K 8/02* (2013.01)

(58) Field of Classification Search
None
See application file for complete search history.

(56) References Cited

U.S. PATENT DOCUMENTS

| | | | |
|---|---|---|---|
| 3,285,849 A | 11/1966 | Watanabe | |
| 4,134,786 A | 1/1979 | Humphrey | |
| 6,613,899 B1* | 9/2003 | Kuzee | C09K 8/528 210/698 |
| 6,866,797 B1 | 3/2005 | Martin | |
| 7,358,215 B1 | 4/2008 | Subramanian | |
| 7,528,100 B2 | 5/2009 | Gunn | |

(Continued)

FOREIGN PATENT DOCUMENTS

WO     WO 9515984 A1 *   6/1995   ........ C08B 37/0054

OTHER PUBLICATIONS

Rossmoore et al. (Handbook of Biocide and Preservative Use, 1995, pp. 200-201).*

(Continued)

*Primary Examiner* — Clare M Perrin
(74) *Attorney, Agent, or Firm* — Owens Law Firm, PC

(57) ABSTRACT

The present invention is directed to methods for treating liquid streams containing quaternary ammonium compounds. In particular, the invention and its various embodiments relate to the addition of certain chemicals, such as inulins and derivatives thereof, including, for example, carboxymethyl inulin with or without various degrees of substitution of carboxymethyl groups per monosaccharide unit, to a liquid stream containing quaternary ammonium compounds to reduce, eliminate, or sequester the quaternary ammonium compound in the liquid stream.

20 Claims, 2 Drawing Sheets

(56) References Cited

U.S. PATENT DOCUMENTS

| | | | |
|---|---|---|---|
| 2005/0155796 A1* | 7/2005 | Eoff | C09K 8/035 |
| | | | 175/72 |
| 2007/0102359 A1 | 5/2007 | Lombardi | |
| 2008/0053900 A1* | 3/2008 | Shafer | C02F 9/00 |
| | | | 210/631 |

OTHER PUBLICATIONS

Krol, Barbara, Effect of Mannanoligosaccharides, Inulin and Yeast Nucleotides Added to Calf . . . , Electronic Journal of Polish Agricultural Universities, 2011, vol. 14, Issue 2.

Wojtanowicz, Environmental Control Technology for Oilfield Processes, Environmental Technology in the Oil Industry, 2008, pp. 45-46,Orszulik, S. ed., Springer, Hampshire, UK.

* cited by examiner

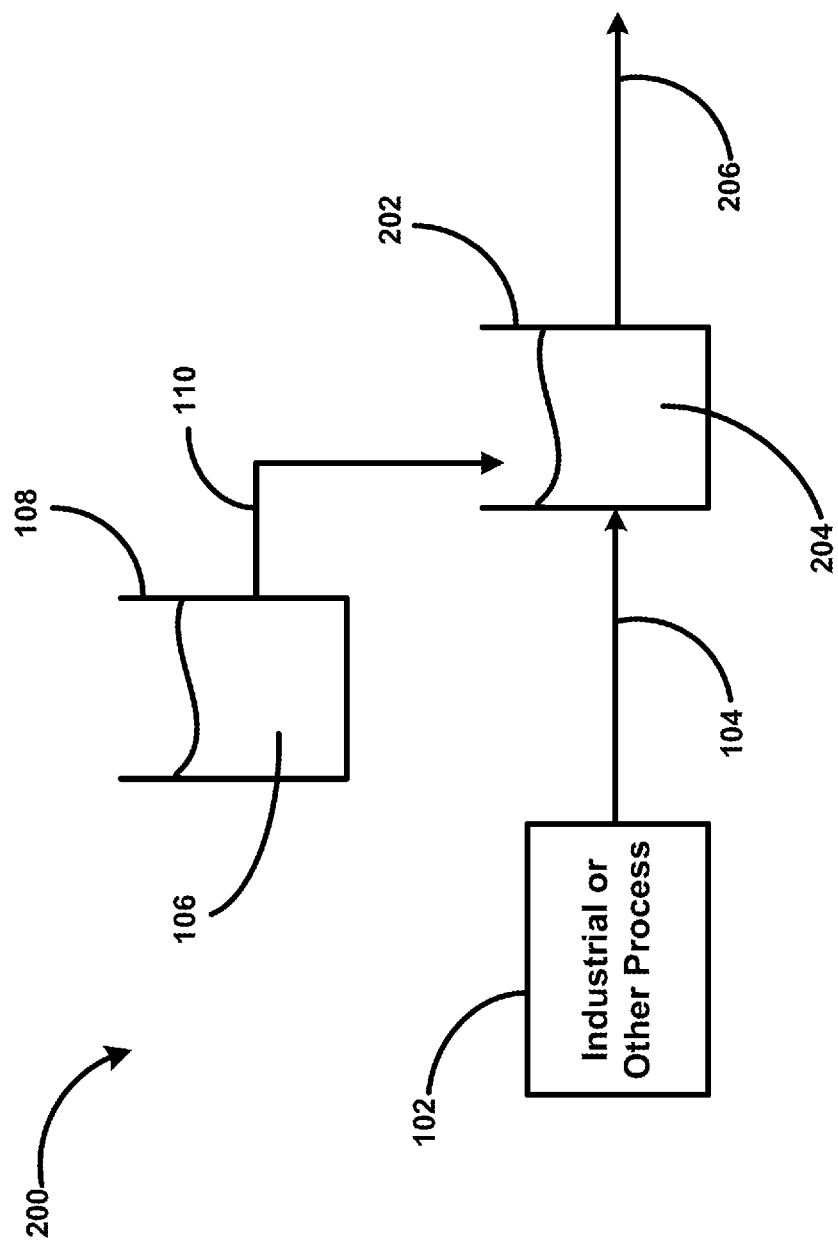

METHODS FOR TREATING LIQUID STREAMS CONTAINING QUATERNARY AMMONIUM COMPOUNDS

CROSS-REFERENCE TO RELATED APPLICATIONS

This application claims the benefit of provisional Application No. 61/705,529, filed Sep. 25, 2012. The entirety of the foregoing application is incorporated by reference herein.

BACKGROUND

Background of the Invention

The invention and its various embodiments relate to methods for treating liquid streams containing quaternary ammonium compounds. In particular, the invention and its various embodiments relate to the addition of certain chemicals to a liquid stream containing quaternary ammonium compounds to reduce, eliminate, or sequester the quaternary ammonium compound in the liquid stream.

Description of Related Art

Quaternary ammonium compounds are well known for their sanitization and disinfectant properties and are used, for example, in the medical and food industries for cleaning surfaces and equipment. Quaternary ammonium compounds are also added to a variety of industrial or process slurries and liquid streams to reduce and or eliminate biological activity that comes in contact with the treated streams. In some cases, quaternary ammonium compounds are add to certain process streams that may contaminant process equipment with biological activity, such as algae growth, as part of a cleaning-in-place process to sanitize and disinfect that process equipment. For example, quaternary ammonium compounds are added to process streams to minimize or eradicate zebra clam formation in process lines and equipment or to minimize biological activity, such as algae growth, in firefighting equipment that is used to move large volumes of water that may contain biological activity. Quaternary ammonium compounds are also used in oil and gas hydraulic fracking processes to minimize biological film build-up in the fractures in the ground.

However, such quaternary ammonium compounds are toxic, and discharge to the environment may have detrimental effects on surrounding biological activity. For example, discharge of a liquid stream that has been treated with a quaternary ammonium compound could be toxic to aquatic organisms existing in surrounding water systems and may pose a danger to human health as well. Accordingly, it would be desirable to treat such liquid streams to which quaternary ammonium compounds have been added to reduce, remove, or sequester such compounds, for example, prior to discharge of the liquid stream to the environment.

SUMMARY OF THE INVENTION

In general, the present invention relates to methods for treating liquid streams to which quaternary ammonium compounds have been added to at least reduce the concentration of, remove, or sequester the quaternary ammonium compounds in that liquid stream. It has been surprising found that certain biopolymers derived from chicory root extract, such as carboxymethyl inulin derived from naturally occurring inulin, available in commercial form as DEQUEST PB 11615, 11620, 11620D, 11625, 11625D, 13620, 13625, 15625, and 1201 from Thermphos International, are effective in reducing the concentration of, removing, or sequestering quaternary ammonium compounds from a liquid stream.

In one embodiment, the present invention comprises a method for reducing the effective concentration of a quaternary ammonium compound in a liquid stream, comprising adding an inulin derivative to a liquid stream comprising a quaternary ammonium compound, thereby reducing an effective concentration of the quaternary ammonium compound in the liquid stream.

BRIEF DESCRIPTION OF THE DRAWINGS

FIG. 2 is a flow diagram for treating a liquid process stream containing quaternary ammonium compounds according to another embodiment of the invention.

DETAILED DESCRIPTION OF THE INVENTION

Figure 1:
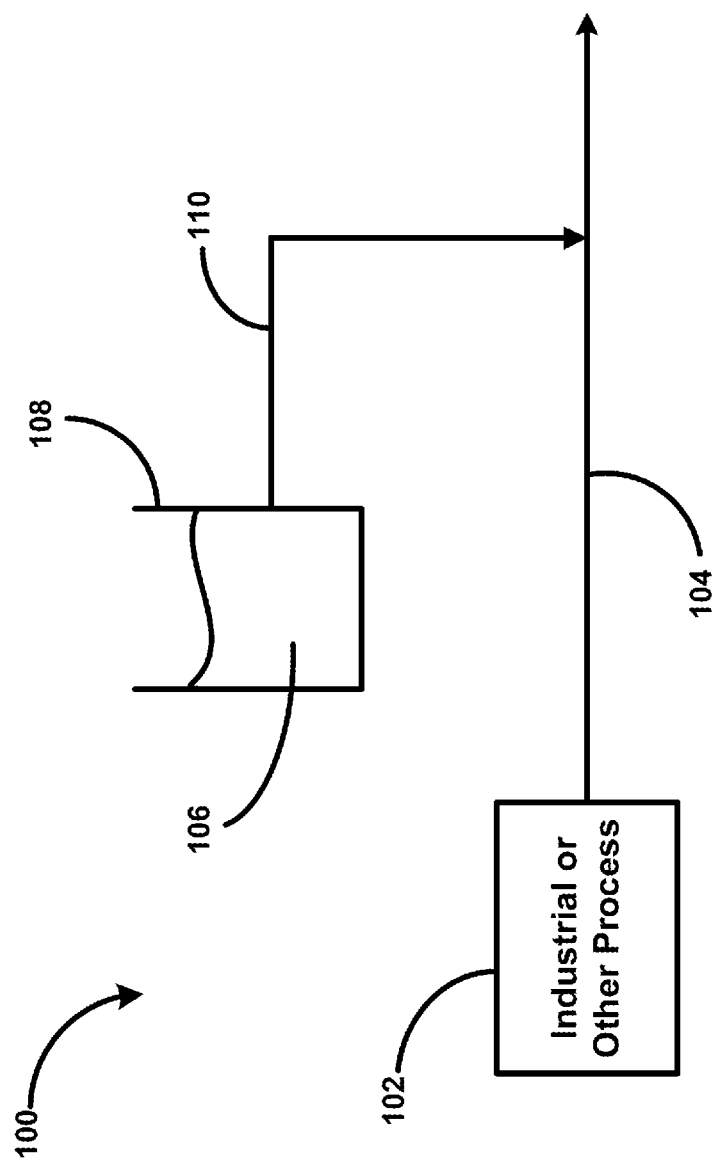
FIG. 1 is a flow diagram for treating a liquid process stream containing quaternary ammonium compounds according to one embodiment of the invention.

The present invention is more fully described below with reference to the accompanying drawings. While the invention will be described in conjunction with particular embodiments, it should be understood that the invention can be applied to a wide variety of applications, and it is intended to cover alternatives, modifications, and equivalents as may be included within the spirit and scope of the invention. Accordingly, the following description is exemplary in that several embodiments are described (e.g., by use of the terms "preferably" or "for example"), but this description should not be viewed as limiting or as setting forth the only embodiments of the invention, as the invention encompasses other embodiments not specifically recited in this description. Further, the use of the term "invention" throughout this description is used broadly and is not intended to mean that any particular portion of the description is the only manner in which the invention may be made or used.

In general, it has been surprising found that certain biopolymers derived from chicory root extract, such as carboxymethyl inulin derived from naturally occurring inulin, available in commercial form as DEQUEST PB 11615, 11620, 11620D, 11625, 11625D, 13620, 13625, 15625, and 1201 from Thermphos International, are effective in reducing the concentration of, removing, or sequestering quaternary ammonium compounds from a liquid stream. Dequest PB 11620, a dark brown liquid, contains 20% active liquid product and has 2.0 degrees of substitution, which means that there are on average two carboxymethyl groups per monosaccharide unit in the carboyxmethyl inulin compound. Dequest PB 11625, a dark brown liquid, contains 25% active liquid product and has 2.5 degrees of substitution, which means that there are on average 2.5 carboxymethyl groups per monosaccharide unit in the carboyxmethyl inulin compound. Dequest PB 11625D, an amber colored liquid that has been decolorized, contains 25% active liquid product and has 2.5 degrees of substitution. Dequest PB 13620 is a 40% active dry powder compound with two degrees of substitution. Dequest PB 13625 is a 38% active dry powder compound with 2.5 degrees of substitution. Dequest PB 15625 is a 38% active liquid product with 2.5 degrees of substitution. Dequest PB 1201 is a 33% active liquid product with 2.5 degrees of substitution. Other degrees, such as three degrees, of substitution may be possible. The structure of carboxymethyl inulin is as follows:

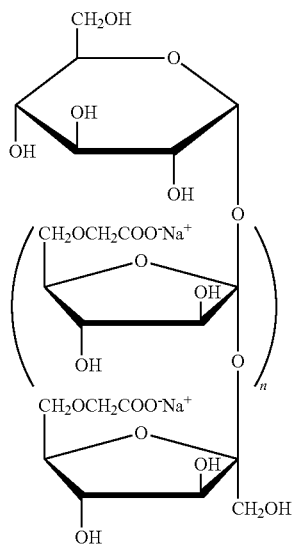

In particular, but not being limited by theory, it is believed that these biopolymers, such as carboxymethyl inulin, when added to a liquid stream containing quaternary ammonium compounds, sequesters the quaternary ammonium compounds thereby reducing, minimizing, or eliminating the effect of what would be otherwise available quaternary ammonium compounds in solution. This ability to reduce, minimize, or eliminate the ability of quaternary ammonium compound to interact, for example, with any biological activity is referred to as reducing the effective concentration of the quaternary ammonium compound. Accordingly, the addition of these biopolymers basically reduces the effectiveness of the quaternary ammonium compound in solution and, again, is referred to as reducing the effective concentration of the quaternary ammonium compound, regardless of whether such reduced effectiveness is mechanistically accomplished through sequestration of the quaternary ammonium compound or chemical degradation of the compound.

Inulins are a group of naturally-occurring polysaccharides produced by many types of plants. For example, inulins are found in the roots of the chicory plant. Carboxymethyl inulin is a biopolymer derived from natural β (2-1) poly-fructoside with a glucose unit at the reducing end extracted from chicory root. In one embodiment for its production, carboxymethyl inulin can be produced by first extracting inulin from a given plant, such as chicory root, using water and then adding sodium chloroacetic acid and sodium hydroxide to the extracted inulin. More specifically, carboxylate groups are introduced into the polysaccharide by carboxymethylation with sodium monochloroacetate as a reagent in an alkaline medium provided by the sodium hydroxide. It is understood that carboxymethyl inulin is not toxic. Therefore, its release into the environment should not have any detrimental effects. As noted, various solutions of carboxymethyl inulin having different concentrations or strengths are available from Thermphos International (e.g., as DEQUEST PB 11615, 11620, 11620D, 11625, 11625D, 13620, 13625, 15625, and 1201). A solid form of carboxymethyl inulin may also be available commercially.

The addition of carboxymethyl inulin, in a form such as that provided by Thermphos International as DEQUEST PB 11615, 11620, 11620D, 11625, 11625D, 13620, 13625, 15625, and 1201, to a liquid stream containing quaternary ammonium compounds has wide-spread use. For example, in some embodiments, it can be added to any process stream containing quaternary ammonium compounds prior to discharge of the process stream. In some embodiments, the liquid process stream may be a liquid stream from any industrial process that adds quaternary ammonium compounds to that stream but where it is desirable to subsequently reduce the effective concentration of the quaternary ammonium compound in that stream. For example, quaternary ammonium compounds may be added to a given process stream to reduce biological activity but reduction of the effective concentration of the quaternary ammonium compound before discharge of that stream may be desirable. In such embodiments, the carboxymethyl inulin may be added, for example, upstream or downstream of a waste water pre-treatment facility.

In some embodiments, carboxymethyl inulin can be added to a liquid stream containing quaternary ammonium compounds that is used in oil and gas fracking processes. In these embodiments, it may be possible to utilize quaternary ammonium compounds to reduce biological film build-up in the fractures in the ground caused by the fracking process. After the quaternary ammonium compound has performed its function of minimizing or reducing biological activity in the fractures, carboxymethyl inulin could then be added to these fractures to reduce the effective concentration of the quaternary ammonium compounds and to minimize the environmental effect of quaternary ammonium compounds in these cases or in the fracturing slurries and liquid streams.

In some embodiments, carboxymethyl inulin can be added to a liquid stream containing quaternary ammonium compounds to block a functional cationic charge site on the quaternary ammonium compound. In these embodiments, blocking such a site on the quaternary ammonium compound would make that site unavailable for use and accelerate degradation of the quaternary ammonium compound.

Accordingly, the following description of the use of inulin derivatives, such as carboxymethyl inulin, is presented in the context of treating a generic liquid stream containing quaternary ammonium compounds to reduce the effective concentration of the quaternary ammonium compounds in that stream. It should be appreciated that this generic liquid stream could be any liquid stream containing quaternary ammonium compounds, such as any of those streams described above or any other process stream, such as an industrial process stream. It should be appreciated that this generic stream may be a waste or discharge stream from any process or industrial process, or it may be an intermediary stream or process stream existing within a given process but that may not necessarily be discharged from the process.

FIG. 1 is a flow diagram for treating a liquid process stream containing quaternary ammonium compounds according to one embodiment of the invention. In this process 100, a given process or industrial process 102 produces a liquid stream 104 containing quaternary ammonium compounds. It should be appreciated, as described above, that this liquid stream 104 may be any liquid stream containing quaternary ammonium compounds, regardless of the rationale for adding the quaternary ammonium compounds.

A solution of inulin derivative 106, such as carboxymethyl inulin, is held in a feed tank 108 and fed to the liquid stream 104 containing the quaternary ammonium compounds via a feed stream 110. It should be appreciated that the strength or concentration of the inulin derivative 106 in the feed tank 108 may be adjusted to a concentration necessary to treat the liquid stream 104 effectively or to provide the desired reduction in the effectiveness of the quaternary ammonium compounds in the liquid stream 104.

Upon addition of the solution of inulin derivative 106 via the feed stream 110 to the liquid stream 104, the inulin derivative will reduce the effective concentration of quaternary ammonium compounds in the liquid stream 104. As described above, the reduction in the effective concentration of the quaternary ammonium compounds in the liquid stream 104 means that the quaternary ammonium compounds may either be degraded, sequestered, or rendered ineffective in that its ability to function in reducing biological activity such that its effectiveness in reducing biological activity is either reduced or eliminated. In some embodiments, this means that typical methods used to detect quaternary ammonium compounds would detect less in the liquid stream 104. The liquid stream 104 may thereafter be further used as necessary in the industrial process 102 or discharged.

FIG. 2 is a flow diagram for treating a liquid process stream containing quaternary ammonium compounds according to another embodiment of the invention. The process 200 shown in FIG. 2 is similar to that shown in FIG. 1 except that the liquid stream 102 is fed to a holding tank or reaction tank 202 that retains the liquid stream 102 for a predetermined period of time or residence time. The solution of inulin derivative 106 in the feed tank 108 is fed to the holding tank 202 via the feed stream 110. Accordingly, in this embodiment, the combined liquid stream 104 and the feed stream 110 containing the inulin derivative 108 form a solution 204 in the holding tank 202. The residence time in the holding tank 202 for this solution 204 provides time for the reaction of the inulin derivative and the quaternary ammonium compounds, resulting in a reduction in the effective concentration of the quaternary ammonium compounds in the liquid stream 104. The liquid stream having a reduced effective concentration of the quaternary ammonium compound 206 then exits the holding tank 202 and can similarly thereafter be further used as necessary in the industrial process 102 or discharged.

Similar to the process of FIG. 1, it should be appreciated that the strength or concentration of the inulin derivative in the solution of inulin derivative 106 in the feed tank 108 may be adjusted to a concentration necessary to treat the liquid stream 104 in the holding tank 202 effectively or to provide the desired reduction in the effectiveness of the quaternary ammonium compounds in the liquid stream 104. It should also be appreciated that one of skill in the art can determine or adjust the amount of the inulin derivative in the solution of inulin derivative 106 in the feed tank 108 (in the process shown in either FIG. 1 or 2) required to reduce the effective concentration of any quaternary ammonium compounds by, for example, measuring the amount of residual quaternary ammonium compounds and adjusting the addition rate of the feed stream 110 or the concentration of the inulin derivative in the solution of inulin derivative 106 in the feed tank 108. Such adjustments may also be done depending upon specific process operating conditions, such as the amount of quaternary ammonium compounds in the liquid stream 104 and the overall system water balance of the industrial process 102. It should also be appreciated that although the foregoing has been described using a solution of inulin derivative, a solid form of inulin derivative may be used. In this case, the solid form may be added directly to the liquid stream 104 or to the holding tank 202.

It should be appreciate that in some embodiments, it is believed that the ratio of inulin derivative, such as that provided by Thermphos Industrial, to the quaternary ammonium compound is 1 part of inulin derivative to 1 part of quaternary ammonium compound. However, it should be appreciated that in those cases where another chemical is present that may interfere or compete with the quaternary ammonium compound for the inulin derivative, additional inulin derivative may be required to provide the same effective reduction in the concentration of the quaternary ammonium compound. For example, where there are other interferences such as the presence of a relatively high concentration of dissolved calcium in the liquid being treated, a higher concentration of the inulin derivative may be required to provide sufficient inulin derivative to react with or sequester the quaternary ammonium compound. Alternatively, a mixture of inulin derivative and an additional chelating agent or sequestering agent specific to the interfering chemical, such as calcium, could be used. In this case, with reference to FIGS. 1 and 2, the mixture of inulin derivative and chelating agent or sequestering agent could be combined in the feed tank 108 and fed together via the feed stream 110 to the liquid stream 104 or the holding tank 204.

It should also be appreciated that in some embodiments the inulin derivative, such as that provided by Thermphos International, may be used to reduce scale or prohibit scale formation. In these cases where the liquid stream being treated to reduce scale formation also contains quaternary ammonium compounds, an additional amount of inulin derivative may be added to accomplish both purposes—the reduction of scale formation through, for example, the removal of cations, such as calcium, instrumental in the formation of scale, and a reduction in the effective concentration of the quaternary ammonium compound.

Although the foregoing invention has been described in some detail to facilitate understanding, it will be apparent that certain changes and modifications may be practiced within the scope of the appended claims. For example, although the above embodiments have been described in connection with the use of carboxymethyl inulin, other inulin derivatives or inulin itself could possibly be used to accomplish the same function of reducing the effective concentration of quaternary ammonium compounds. Further, although various embodiments for specific uses have been described, such as use in fracturing, it should be appreciated that the methods of the present invention can be used with any process stream containing quaternary ammonium compounds for which it is desirable to reduce the effective concentration of the quaternary ammonium compounds. Accordingly, the described embodiment is to be considered as illustrative and not restrictive, and the invention is not to be limited to the details given herein, but may be modified within the scope and equivalents of the appended claims.

What is claimed is:

1. A method for reducing the effective concentration of a quaternary ammonium compound in a liquid stream, comprising:

adding an inulin derivative to a liquid stream comprising a quaternary ammonium compound, thereby reducing an effective concentration of the quaternary ammonium compound in said liquid stream; and passing said liquid stream to a waste water pre-treatment facility.

2. The method of claim 1, wherein said inulin derivative comprises a carboxymethyl inulin.

3. The method of claim 1, wherein said liquid stream comprises a liquid waste stream from an industrial process.

4. The method of claim 1, further comprising:
making a functional cationic charge site on the quaternary ammonium compound unavailable, thereby accelerating degradation of the quaternary ammonium compound.

5. The method of claim 1, further comprising:
adding said quaternary ammonium compound to said liquid stream prior to said adding of said inulin derivative to reduce biological growth in said liquid stream.

6. The method of claim 1, wherein said inulin derivative is derived from naturally occurring inulin.

7. The method of claim 6, wherein said inulin derivative is derived from chicory root extract.

8. The method of claim 1, wherein said liquid stream comprises a liquid stream in a hydraulic fracturing process.

9. The method of claim 8, further comprising:
reducing biological film build-up in fractures caused by the hydraulic fracturing process.

10. The method of claim 1, wherein said adding comprises adding said inulin derivative to said liquid stream upstream of the wastewater treatment facility.

11. The method of claim 1, wherein said adding comprises adding said inulin derivative to said liquid stream downstream of the wastewater treatment facility.

12. A method for reducing the effective concentration of at least one quaternary ammonium compound in a liquid stream, comprising:

feeding a solution comprising an inulin derivative into a liquid stream comprising at least one quaternary ammonium compound;

adjusting the concentration of said inulin derivative in said solution to reduce the effective concentration of the at least one quaternary ammonium compound in said liquid stream; and passing said liquid stream to a waste water pre-treatment facility.

13. The method of claim 12, wherein said inulin derivative comprises a carboxymethyl inulin.

14. The method of claim 12, wherein said liquid stream comprises a liquid waste stream from an industrial process.

15. The method of claim 12, further comprising:
making a functional cationic charge site on the at least one quaternary ammonium compound unavailable, thereby accelerating degradation of the at least one quaternary ammonium compound.

16. The method of claim 12, further comprising:
adding said quaternary ammonium compound to said liquid stream prior to said feeding to reduce biological growth in said liquid stream.

17. The method of claim 12, wherein said inulin derivative is derived from naturally occurring inulin.

18. The method of claim 12, wherein said inulin derivative is derived from chicory root extract.

19. The method of claim 12, wherein said feeding comprises feeding said solution to said liquid stream upstream of the wastewater treatment facility.

20. The method of claim 12, wherein said feeding comprises feeding said solution to said liquid stream downstream of the wastewater treatment facility.

* * * * *